United States Patent
Boutaghou

(10) Patent No.: US 6,731,469 B2
(45) Date of Patent: May 4, 2004

(54) INTEGRAL INERTIAL LATCH DESIGN

(75) Inventor: Zine Eddine Boutaghou, Vadnais Heights, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 95 days.

(21) Appl. No.: 09/893,326

(22) Filed: Jun. 27, 2001

(65) Prior Publication Data

US 2002/0054455 A1 May 9, 2002

Related U.S. Application Data

(60) Provisional application No. 60/217,233, filed on Jul. 10, 2000.

(51) Int. Cl.[7] ............................................... G11B 21/22
(52) U.S. Cl. .................................................. 360/256.4
(58) Field of Search ..................... 360/256, 256.1–256.9

(56) References Cited

U.S. PATENT DOCUMENTS

| | | | | |
|---|---|---|---|---|
| 5,227,936 A | * | 7/1993 | Strickler et al. .......... | 360/97.02 |
| 5,377,065 A | | 12/1994 | Morehouse et al. | |
| 5,408,374 A | | 4/1995 | Morehouse et al. | |
| 5,422,770 A | | 6/1995 | Alt | |
| 5,426,562 A | | 6/1995 | Morehouse et al. ........ | 361/685 |
| 5,442,266 A | | 8/1995 | Morehouse et al. ........ | 318/272 |
| 5,448,433 A | | 9/1995 | Morehouse et al. ...... | 360/97.02 |
| 5,448,436 A | * | 9/1995 | Albrecht | |
| 5,453,889 A | | 9/1995 | Alt ........................... | 360/97.01 |
| 5,469,314 A | | 11/1995 | Morehouse et al. | |
| 5,477,403 A | * | 12/1995 | Strickler | |
| 5,486,964 A | | 1/1996 | Morehouse et al. | |
| 5,555,146 A | * | 9/1996 | Hickox et al. | |
| 5,689,386 A | | 11/1997 | Morehouse et al. ..... | 360/97.02 |
| 5,717,544 A | | 2/1998 | Michael | |
| 5,748,578 A | | 5/1998 | Schell ..................... | 369/44.14 |
| 5,862,019 A | | 1/1999 | Larson | |
| 5,999,371 A | * | 12/1999 | Wood et al. | |
| 6,031,690 A | * | 2/2000 | Kelemen et al. | |
| 6,118,636 A | * | 9/2000 | Hatch et al. ............. | 360/256.4 |
| 6,163,440 A | * | 12/2000 | Takahashi et al. ........ | 360/256.4 |
| 6,198,603 B1 | * | 3/2001 | West .......................... | 360/256 |
| 6,275,357 B1 | * | 8/2001 | Jang ........................ | 360/256.3 |
| 6,327,119 B1 | * | 12/2001 | Barina et al. ............ | 360/256.4 |

* cited by examiner

Primary Examiner—Allen Cao
(74) Attorney, Agent, or Firm—Derek J. Berger

(57) ABSTRACT

The present invention includes a disc drive including an integral inertial latch comprised of a single material having a fixed pivot, an inertial mass and at least one spring. The at least one spring attaches the inertial mass to the fixed pivot. In one embodiment the disc drive has an integral inertial latch that includes a plurality of spoke springs that radiate outwardly from the fixed pivot to a ring shaped inertial mass. In one embodiment the disc drive includes an integral inertial latch that includes two leaf springs that attach the inertial mass to the fixed pivot. The inertial mass translates perpendicular to the fixed pivot.

19 Claims, 6 Drawing Sheets

INTEGRAL INERTIAL LATCH DESIGN

RELATED APPLICATION

This application claims the benefit of U.S. Provisional Application Ser. No. 60/217,233, filed Jul. 10, 2000 under 35 U.S.C. 119(e).

FIELD OF THE INVENTION

The present invention relates to the field of mass storage devices. More particularly, this invention relates to an integral inertial latch for a mass storage device.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, which is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring that produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

When the disc drive is not operating the actuator assembly is rotated away from and parked in a parking area. Because of the adverse consequences if the actuator contacts or impacts the data region of the disc, disc drives that park the actuator typically have some type of actuator lock to prevent the actuator from moving the carrier toward the data region of the disc in the event of external shock. Passive magnetic or spring locks apply restraining forces that are overcome when the drive is turned on and the actuator is activated.

Existing latch designs include several different parts that require assembly and inventory of each part. Multiple parts complicate assembly and create additional inventory resources.

What is needed is an inertial latch design that overcomes the problems of prior art latch systems.

SUMMARY OF THE INVENTION

The present invention provides an inertial latch for a mass storage device that reduces the cost and complexity of the latch mechanism. The present invention includes a disc drive including an integral inertial latch having a fixed pivot, an inertial mass and at least one spring. The at least one spring attaches the inertial mass to the fixed pivot.

In one embodiment the disc drive has an integral inertial latch that includes a plurality of spoke springs that radiate outwardly from the fixed pivot to a ring shaped inertial mass. In one embodiment the disc drive includes an integral inertial latch that includes two leaf springs that attach the inertial mass to the fixed pivot. The inertial mass translates perpendicular to the fixed pivot. In one embodiment the integral inertial latch is comprised of a single material, such as plastic.

In one embodiment the integral inertial latch is comprised of a single material and includes an inertial mass, a plurality of spoke springs, and a fixed pivot. The spoke springs radiate outwardly from the fixed pivot to the inertial mass attach the inertial mass to the fixed pivot. The inertial mass is rotatable about the fixed pivot.

One embodiment provides a method of latching an actuator of a disc drive including providing an integral inertial latch having a fixed pivot, an inertial mass, and a spring connecting the inertial mass to the fixed pivot, and latching the actuator with the integral inertial latch upon translational or rotational movement of disc drive. Additional features and benefits will become apparent upon a review of the attached figures and the accompanying description.

DESCRIPTION OF THE PREFERRED EMBODIMENT

In the following detailed description of the preferred embodiments, reference is made to the accompanying drawings that form a part hereof, and in which are shown by way of illustration specific embodiments in which the invention may be practiced. It is to be understood that other embodiments may be utilized and structural changes may be made without departing from the scope of the present invention.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable.

Figure 1:
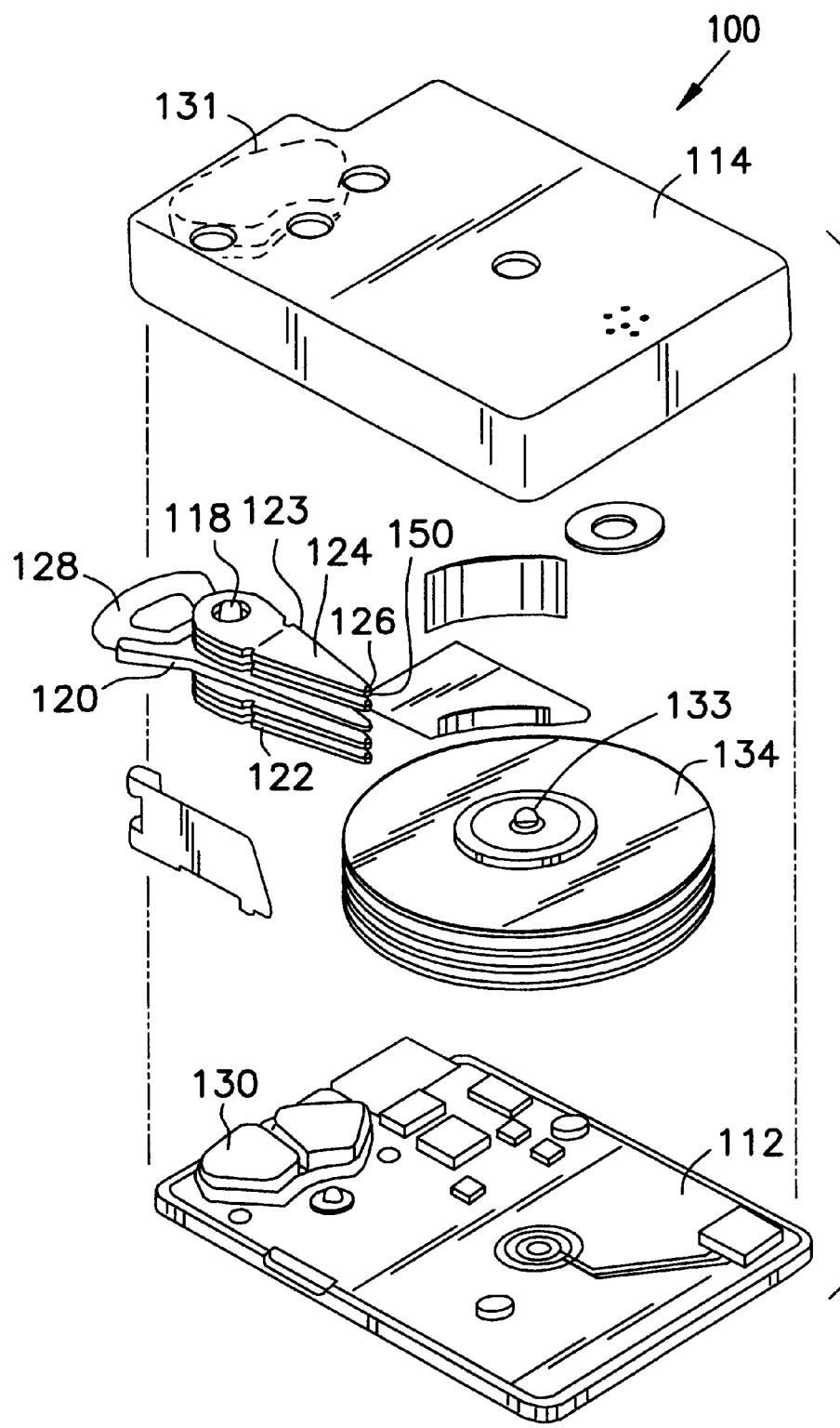
FIG. 1 is an exploded view of a disc drive with a multiple disc stack and a ramp assembly for loading and unloading transducers to and from the surfaces of the discs.

FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131 and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 133 or under the hub.

Attached within the base 112 is a first magnet 130 and a second magnet 131. As shown in FIG. 1, the second magnet 131 is associated with the cover 114. The first and second magnets 130, 131 and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors that are within the hub 133 or under the hub.

Figure 2:
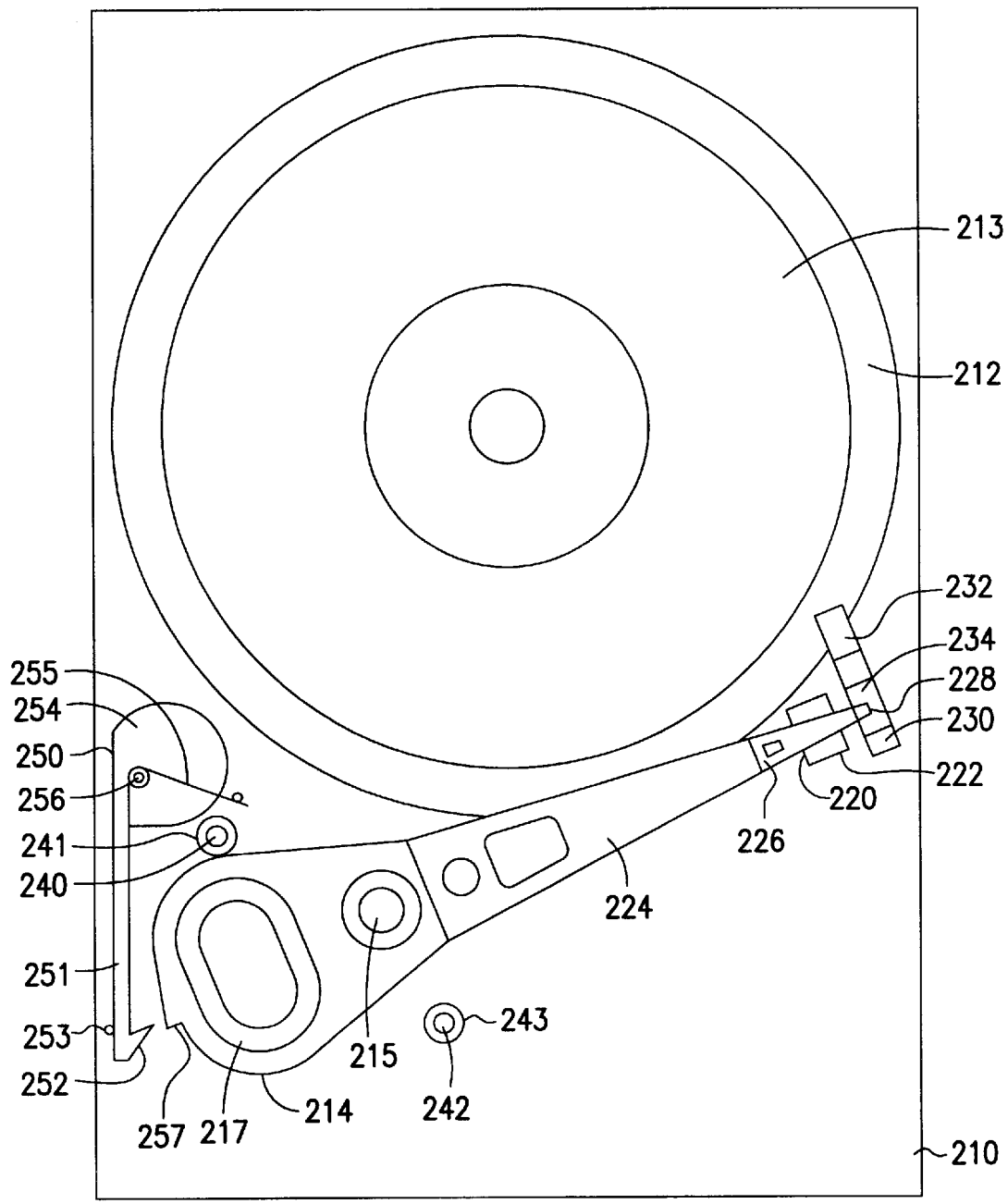
FIG. 2 is a top view of a prior art disc drive with an actuator and an inertial latch.

Referring to FIG. 2, there is illustrated a top view of the interior of a prior art disc drive with the housing cover removed. For ease of illustration and explanation, the disc drive depicted in FIG. 2 is shown as having a single recording head and associated disc surface, although conventional disc drives typically have multiple heads and discs. The disc drive comprises a housing base 210 to which are secured a disc drive or spindle motor with attached disc 212, a rotary actuator 214, a load/unload ramp 230, and a rotary inertial lock 250. The base 210 and a cover (not shown) provide a substantially sealed housing for the disc drive.

The rotary actuator 214 rotates on a pivot 215 mounted to base 210. Actuator 214 is typically a balanced rotary voice coil motor (VCM) actuator having a coil 217 that moves through the fixed magnetic field of a magnet assembly (not shown) mounted to base 210. An outside diameter (OD) crash stop 240 and an inside diameter (ID) crash stop 242 are mounted to base 210 to limit the travel of rotary actuator 214. The crash stops may be rigid posts with elastomeric O-rings, such as O-rings 241, 243 on crash stops 240, 242, respectively. Alternatively, the crash stops may be rubber bumpers or resilient cantilever beams. The actuator 214 has on the end opposite coil 217 a rigid arm 224. A suspension 226 is attached to the end of actuator arm 224. The suspension 226 may be a conventional type of suspension such as the well-known Watrous suspension, as described in U.S. Pat. No. 4,167,765 assigned to IBM. The suspension 226 supports the head carrier or air-bearing slider 222 and includes a tab 228 that extends beyond the slider 222. A read/write head or transducer 220 is formed on the trailing end of slider 222. Transducer 220 may be an inductive read and write transducer or an inductive write transducer with a magneto resistive (MR) read transducer formed by thin film deposition techniques as is known in the art.

A load/unload ramp 230 having a ramp portion 232 and a recess 234 is mounted to the base 210. Ramp 230 supports the suspension tab 228 in its recess 234 and thus serves as the parking location for actuator 214 when the disc drive is not operating. FIG. 2 illustrates the actuator 214 parked, i.e., suspension tab 228 residing in ramp recess 234 and the actuator 214 forced against the O-ring 241 of OD crash stop 240. If the disc drive were a CSS disc drive, then the actuator 214 would be parked against the O-ring 243 of ID crash stop 242 and the slider 222 would be at rest on a textured nondata landing zone at the ID region of the disc 212. A passive actuator lock or a solenoid lock would be used to keep the actuator 214 parked with the slider 222 at the landing zone. It should be noted that even though a disc drive with a ramp 230 is shown, the invention is equally applicable to a disc drive without a ramp 230 which is uses a contact start stop technique.

A rotary inertial lock 250 is also mounted on base 210 and includes an arm 251 having a tip 252, a latch stop 253, a counterweight 254, and a torsion spring 255. The inertial lock 250 is a rigid body, rotationally balanced, that rotates on a pivot 256 mounted to base 210. Pivot 256 is parallel to pivot 215 of actuator 214. The torsion spring 255 (or other means) urges the arm 251 up against latch stop 253 to hold the lock in its open position, which allows free rotation by the actuator 214, as shown in FIG. 2.

Figure 3:
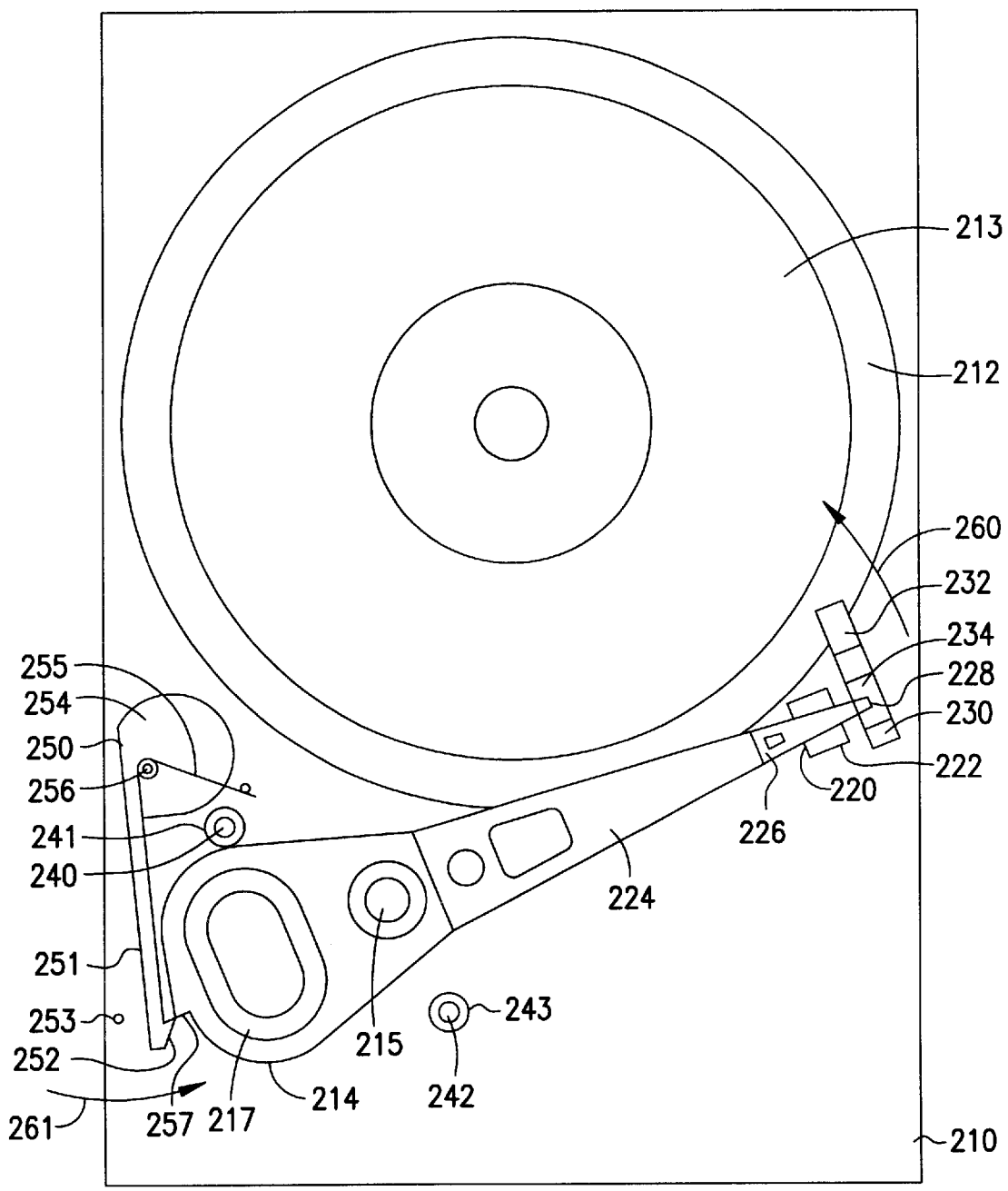
FIG. 3 is a top view of a prior art disc drive with an actuator and an inertial latch.

When the rotary lock is in the locked position (see FIG. 3), the tip 252 is engaged with a mating surface 257 on actuator 214, which prevents actuator 214 from moving the suspension tab 228 off the ramp recess 234. FIG. 3 shows the latch tip 252 and the actuator mating surface 257 at an imaginary engagement point 259, which is the intersection of the circular arcs formed by the tip 252 and mating surface 257. If the disc drive were a CSS disc drive, the rotary lock 250 would be designed to rotate in the opposite direction from that shown in FIG. 2 and would be located on the other side of actuator 214 near crash stop 242.

During read/write operations of the disc drive, the drive motor rotates the disc 212 at a constant speed, and the actuator 214 rotates about pivot 215 to move the slider 222 generally radially across the surface of the disc 212 so that the read/write transducer 220 may access different data tracks on the data region 213. The arm 251 of rotary lock 250 is biased against latch stop 253 by spring 255 so that actuator 214 is free to rotate about pivot 215. The suspension 226 provides a loading force to the slider 222 to urge it toward the surface of disc 212. The data detected from disc 212 by the transducer 220 is processed into a data readback signal by signal amplification and processing circuitry (not shown). When the disc drive is powered down, the actuator 214 is driven toward ramp 230 while the disc 212 is still rotating. The suspension tab 228 contacts the ramp portion 232, moves up the ramp portion 232 and off the disc 212, and comes to rest in ramp recess 234. At this time, the actuator 214 is parked and pressed against O-ring 241 of OD crash stop 240.

FIG. 3 shows how the conventional rotary inertial lock 250 works to keep the actuator in this parked position when the drive is not operating. When the drive undergoes a rotational acceleration in the clockwise direction (e.g., when the drive is accidentally dropped or subjected to sudden impact), all bodies inside the drive experience a torque in the direction indicated by arrow 260, i.e., counterclockwise relative to the drive. If no lock is present, the rotary actuator 214 may rotate away from OD crash stop 240 to move the suspension tab off the ramp 230 and allow the slider 222 to enter the data region 213 of the disc 212. As described above, this could damage the head, disc, or suspension, or allow the slider to come to rest on the disc, thereby presenting the stiction problem. However, the rotary inertial lock 250 also experiences the same torque as the actuator 214 and is also free to rotate in the same direction. By appropriate design of the lock 250, the arm 251 will then rotate about pivot 256 away from latch stop 253 (in the direction indicated by arrow 261) and reach the engagement point 259 before the mating surface 257. The rotating actuator 214 will thus be prevented from moving away from its parked location because, shortly after it begins to rotate, the mating surface 257 will intercept the latch tip 252 near the engagement point 259.

Figure 4:
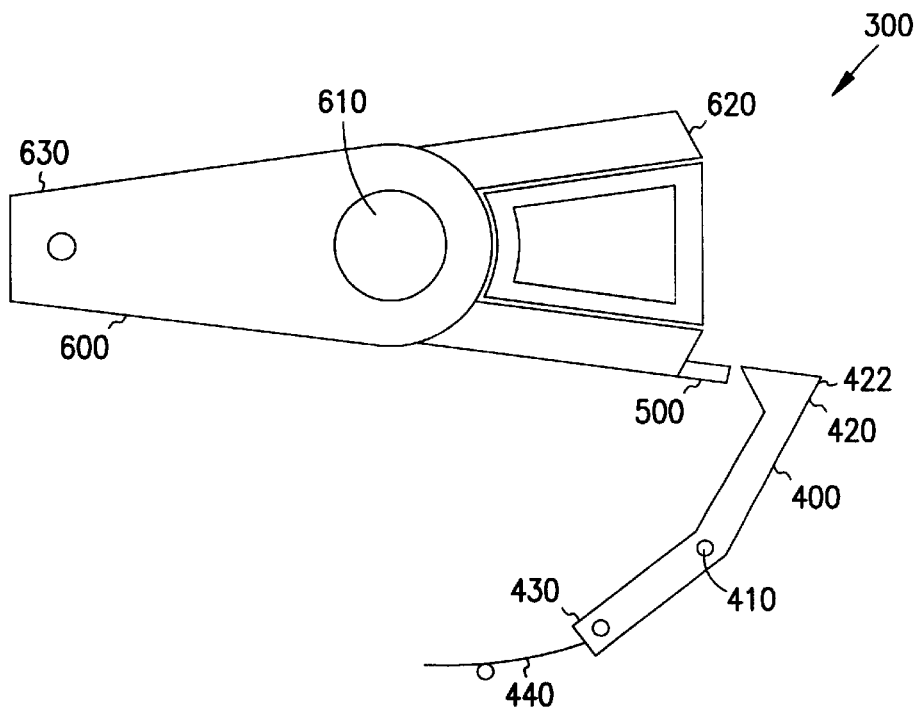
FIG. 4 is a top view of a disc drive with an actuator and an inertial latch.

As shown in FIG. 4, a latching device includes a latching mechanism 300 including a latch 400 and a latch receiver 500. The latch receiver 500 is located on a latch end 620 of an actuator 600. The actuator 600 also has an actuator pivot 610 and a suspension end 630. The latch 400 has a latch pivot 410, an engaging end 420, and a spring end 430. The latch pivot 410 is parallel to the actuator pivot 610. The engaging end 420 has a latch point 422. Latch receiver 500 engages latch point 422. Spring 440 biases the latch 400.

Figure 5:
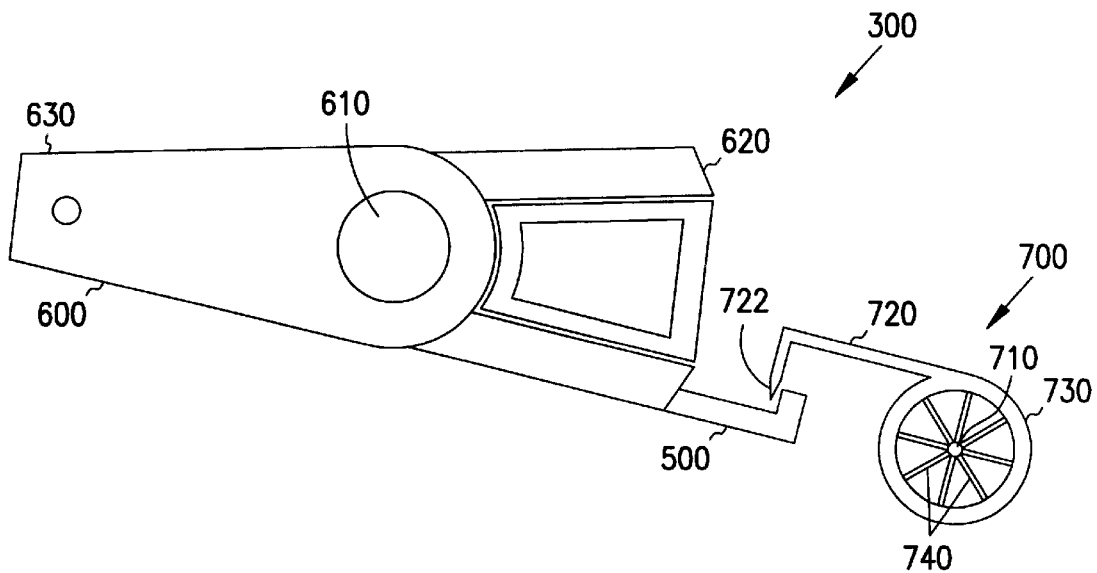
FIG. 5 is a partial top view of a disc drive showing one embodiment of an actuator and a latching mechanism of the present invention.

As shown in FIG. 5, an embodiment of the present invention includes a latching mechanism 300 including an integral inertial latch 700 and a latch receiver 500. The latch receiver 500 is located on a latch end 620 of an actuator 600. The actuator 600 also has an actuator pivot 610 and a suspension end 630. The integral inertial latch 700 has a fixed pivot 710, an engaging arm 720, an inertial ring 730 and a plurality of spoke springs 740. The fixed pivot 710 is parallel to the actuator pivot 610. The engaging arm 720 has a latch point 722. Latch receiver 500 engages latch point 722. The spoke springs 740 bias the integral inertial latch 700.

Figure 6:
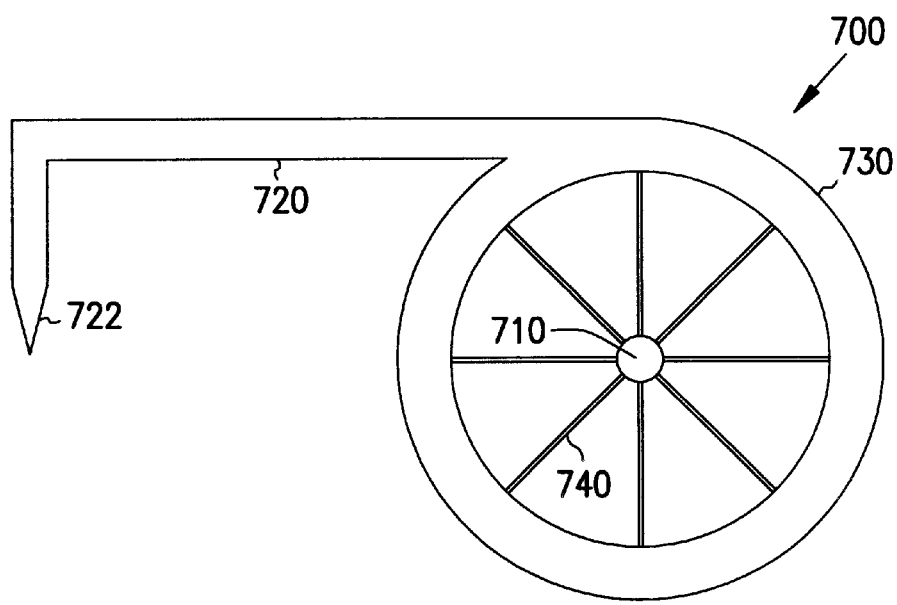
FIG. 6 is an enlarged partial top view of a disc drive showing one embodiment of a latching mechanism of the present invention.

As shown in FIG. 6, integral inertial latch 700 is shown in more detail. As previously discussed, the integral inertial latch 700 has a fixed pivot 710, an engaging arm 720 with a latch point 722, an inertial ring 730 and a plurality of spoke springs 740.

The spoke springs 740 bias the integral inertial latch 700. The spoke springs 740 deform allowing rotational motion of the inertial ring 730 about the fixed pivot 710. The number and location of spoke springs 740 is shown as, but not limited to, eight evenly spaced spokes extending from the fixed pivot 710 to the inertial ring 730. The spoke springs 740 connect the fixed pivot 710 to the inertial ring 730. The spoke springs 740 have a cross section, such as round, square, or rectangular in shape. The number, spacing, size, and shape of the plurality of spoke springs 740 provide adequate bias of the inertia ring 730 with the fixed pivot 710 so that the latch point 722 engages the latch receiver as shown in FIG. 5, so that the actuator 600 is properly secured when the drive is accidentally dropped or subjected to sudden impact.

The inertial ring 730 provides inertial mass to close the integral inertial latch 700 in the event of a lateral or rotational shock, such as when the drive is accidentally dropped or subjected to sudden impact. The inertial ring 730 is shown as but not limited to a ring shape. For example, the inertial ring may be ring, square, oval, octagonal shaped. The cross section of the inertial ring 730 is shown as but not limited to square or round, For example, the cross section of the inertial ring 730 may round, square, oval, octagonal, or rectangular. The inertial ring 730 provides adequate mass to the integral inertial latch 700 so that the latch point 722 engages the latch receiver as shown in FIG. 5 such as when the drive is accidentally dropped or subjected to sudden impact.

The integral inertial latch 700 is formed out of a single material, such as plastic, to provide ease of assembly and a reduced number of parts.

Figure 7:
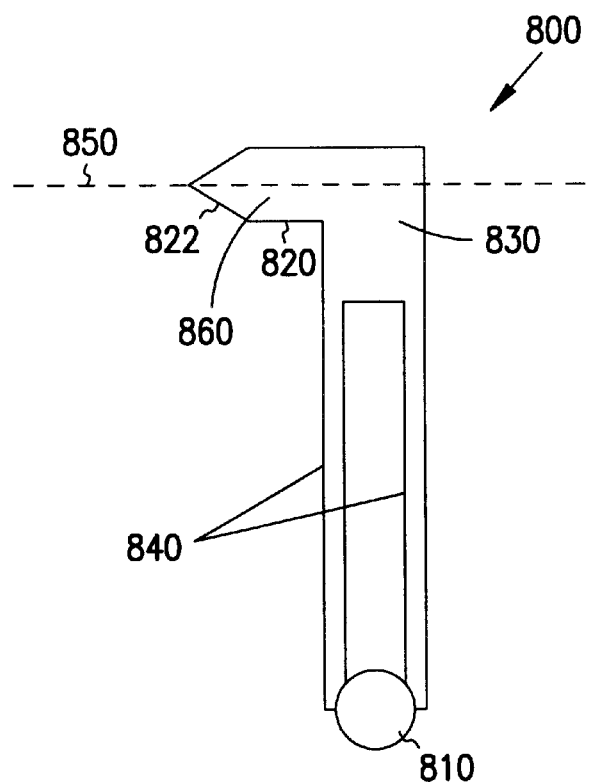
FIG. 7 is an enlarged partial top view of a disc drive showing one embodiment of a latching mechanism of the present invention.

As shown in FIG. 7, an embodiment of the present invention includes an integral inertial latch 800. The integral inertial latch 800 has a fixed pivot 810, an engaging arm 820, an inertial mass 830 and leaf springs 840. The engaging arm 820 has a latch point 822. The leaf springs 840 bias the integral inertial latch 800. The leaf springs 840 deform providing translational or linear motion perpendicular to the fixed pivot 810 along trajectory 850. The number and location of leaf springs 840 is shown as, but not limited to, two parallel spaced leaf springs 840 extending from the fixed pivot 810 to the inertial mass 830. The leaf springs 840 connect the fixed pivot 810 to the inertial mass 830. The leaf springs 840 are also shown as, but not limited to elongated connecting strips. The leaf springs 840 have a cross section, such as round, square, or rectangular in shape. The number, spacing, size, and shape of the leaf springs 840 provide adequate bias of the inertia mass 830 with the fixed pivot 810 so that the latch point 822 engages the latch receiver, so that the actuator 600 is properly secured when the drive is accidentally dropped or subjected to sudden impact.

The inertial mass 830 provides inertial mass to close the integral inertial latch 800 in the event of a lateral or rotational shock. The inertial mass 830 is shown as but not limited to rectangular in shape. For example, the inertial mass 830 may be square, oval, or octagonal shaped. The inertial mass 830 provides inertial mass to close the integral inertial latch 800 in the event of a lateral or rotational shock, such as when the drive is accidentally dropped or subjected to sudden impact. The inertial mass 830 provides adequate mass to the integral inertial latch 800 so that the latch point 822 engages the latch receiver, such as when the drive is accidentally dropped or subjected to sudden impact.

The integral inertial latch 800 is formed out of a single material, such as plastic, to provide ease of assembly and a reduced number of parts. Optionally, a magnet 860 is added to the latch arm 820 (or latch arm 720) to provide both a magnetic as well as inertial latch.

Figure 8:
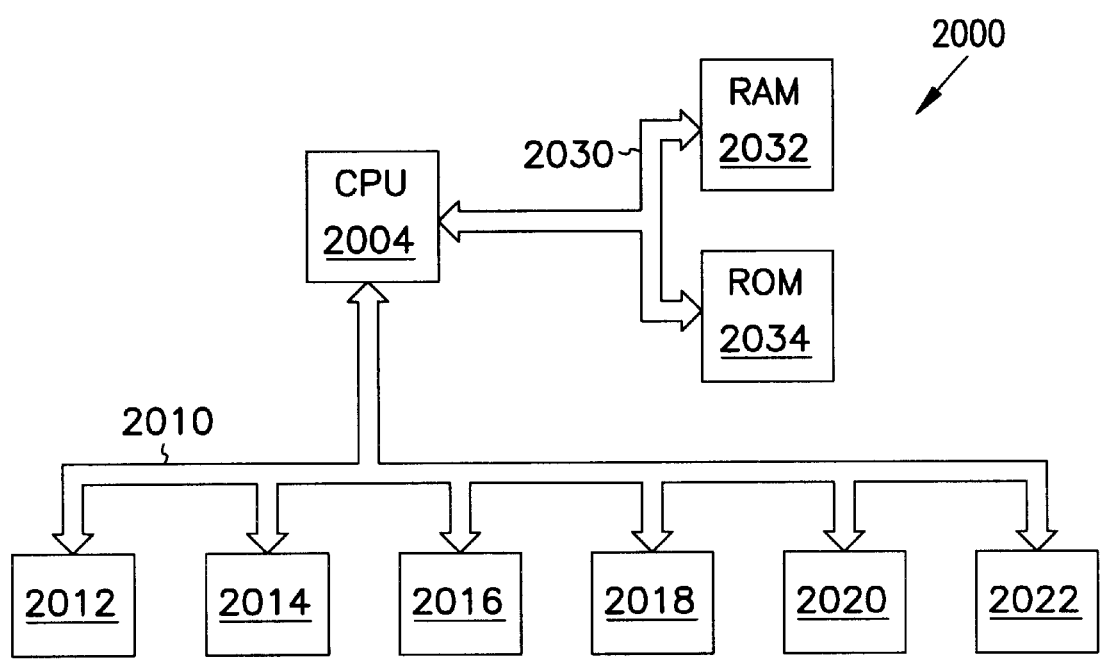
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 includes a disc drive device which includes the integral inertial latch 700, 800 described above. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

In conclusion, the present invention provides a disc drive 100 including an integral inertial latch 700, 800 having a fixed pivot 710, 810, an inertial mass 730, 830, and at least one spring 740, 840. The at least one spring 740, 840 attaches the inertial mass 730, 830 to the fixed pivot 710, 810.

One embodiment includes an inertial mass 730 that rotates about the fixed pivot 710.

One embodiment includes an inertial mass 830 that translates perpendicular to the fixed pivot 810.

One embodiment includes at least one spring 840 that is a leaf spring 840.

One embodiment includes at least one spring 740 that is a spoke spring 740.

One embodiment further includes an additional spring 740, 840.

One embodiment further includes a plurality of spoke springs 740. The plurality of spoke springs 740 radiating outwardly from the fixed pivot 710 to the inertial mass 730.

One embodiment includes an inertial mass 730 that is a ring 730.

One embodiment includes at least one spring 840 that is a leaf spring 840 and further includes an additional leaf spring 840. The leaf springs 840 attach the inertial mass 830 to the fixed pivot 810 and the inertial mass 830 translates perpendicular 850 to the fixed pivot 810.

One embodiment includes a magnet 860.

One embodiment includes a latch 700, 800 that is a single material.

One embodiment includes a latch 700, 800 that is plastic.

One embodiment includes a latch 700, 800 that is a single part.

One embodiment includes an inertial mass 730, a plurality of spoke springs 740, and a fixed pivot 710. The spoke springs 740 attach the inertial mass 730 to the fixed pivot 710 and radiate outwardly from the fixed pivot 710 to the inertial mass 730. The inertial mass 730 is rotatable about the fixed pivot 710 and the latch 700 is a single part.

One embodiment includes a method of latching an actuator 600 of a disc drive 100 including the steps of (a) providing an integral inertial latch 700, 800 having a fixed pivot 710, 810, an inertial mass 730, 830, and a spring 740, 840 connecting the inertial mass 730, 830 to the fixed pivot 710, 810; and (b) latching the actuator 600 with the latch 700, 800 upon translational or rotational movement of disc drive 100.

One embodiment includes the step of (c) rotating the inertial mass 730, 830 about the fixed pivot 710, 810.

One embodiment includes the step of (c) translating the inertial mass 830 perpendicular to the fixed pivot 810.

One embodiment includes a latch 700,800 that is formed out of a single material.

One embodiment includes a disc drive 100 including an actuator 600 and a latching means 700, 800 for locking the actuator 600, the latching means 700, 800 comprising a single part.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data storage device comprising:
   a storage medium;
   a movable member for accessing the storage medium; and
   a latch comprising:
      a fixed pivot;
      an inertial mass;
      a latching element for engaging the movable member; and
      at least one spring attaching the inertial mass to the fixed pivot, wherein the pivot, the mass and the at least one spring together comprise a single, continuous piece of material.

2. The data storage device of claim 1 wherein the inertial mass rotates about the fixed pivot.

3. The data storage device of claim 1 wherein the inertial mass translates perpendicular to the fixed pivot.

4. The data storage device of claim 1 wherein the at least one spring is a leaf spring.

5. The data storage device of claim 1 wherein the at least one spring is a spoke spring.

6. The data storage device of claim 1 in which the at least one spring comprises two springs.

7. The data storage device of claim 1 in which the at least one spring comprises a plurality of spoke springs, the plurality of spoke springs radiating outwardly from the fixed pivot to the inertial mass.

8. The data storage device of claim 7 wherein the inertial mass is a ring.

9. The data storage device of claim 1 wherein the at least one spring comprises two leaf springs, the leaf springs attaching the inertial mass to the fixed pivot, and wherein the inertial mass translates perpendicular to the fixed pivot.

10. The data storage device of claim 1 further comprising a magnet.

11. The data storage device of claim 1 wherein the latch is comprised of a single material.

12. The data storage device of claim 1 wherein the latch is comprised of plastic.

13. The data storage device of claim 1, in which the storage medium comprises a rotatable disc.

14. A latch comprising:

an inertial mass;

a plurality of spoke springs;

a latching element for engaging a movable member; and a fixed pivot, the spoke springs attaching the inertial mass to the fixed pivot, the spoke springs radiating outwardly from the fixed pivot to the inertial mass, and the inertial mass rotatable about the fixed pivot, wherein the pivot, the mass and the springs together comprise a single, continuous piece of material.

15. A method of latching a movable member of a data storage device comprising steps of:

(a) providing a latch having a fixed pivot, an inertial mass, a latching element for engaging the movable member and a spring connecting the inertial mass to the fixed pivot, wherein the pivot, mass and spring together comprise a singles continuous piece of material; and (b) latching the actuator by engaging the movable member with the latching element upon translational or rotational movement of the data storage device.

16. The method of claim 15 further comprising step of (c) rotating the inertial mass about the fixed pivot.

17. The method of claim 15 further comprising the step of (c) translating the inertial mass perpendicular to the fixed pivot.

18. A data storage device comprising:

a storage medium;

a movable member for accessing the storage medium; and the latch of claim 14.

19. The data storage device of claim 18, in which the storage medium comprises a rotatable disc.

* * * * *